E. E. RICHARDSON.
BELT TIGHTENER.
APPLICATION FILED NOV. 5, 1917.
1,338,096.  Patented Apr. 27, 1920.
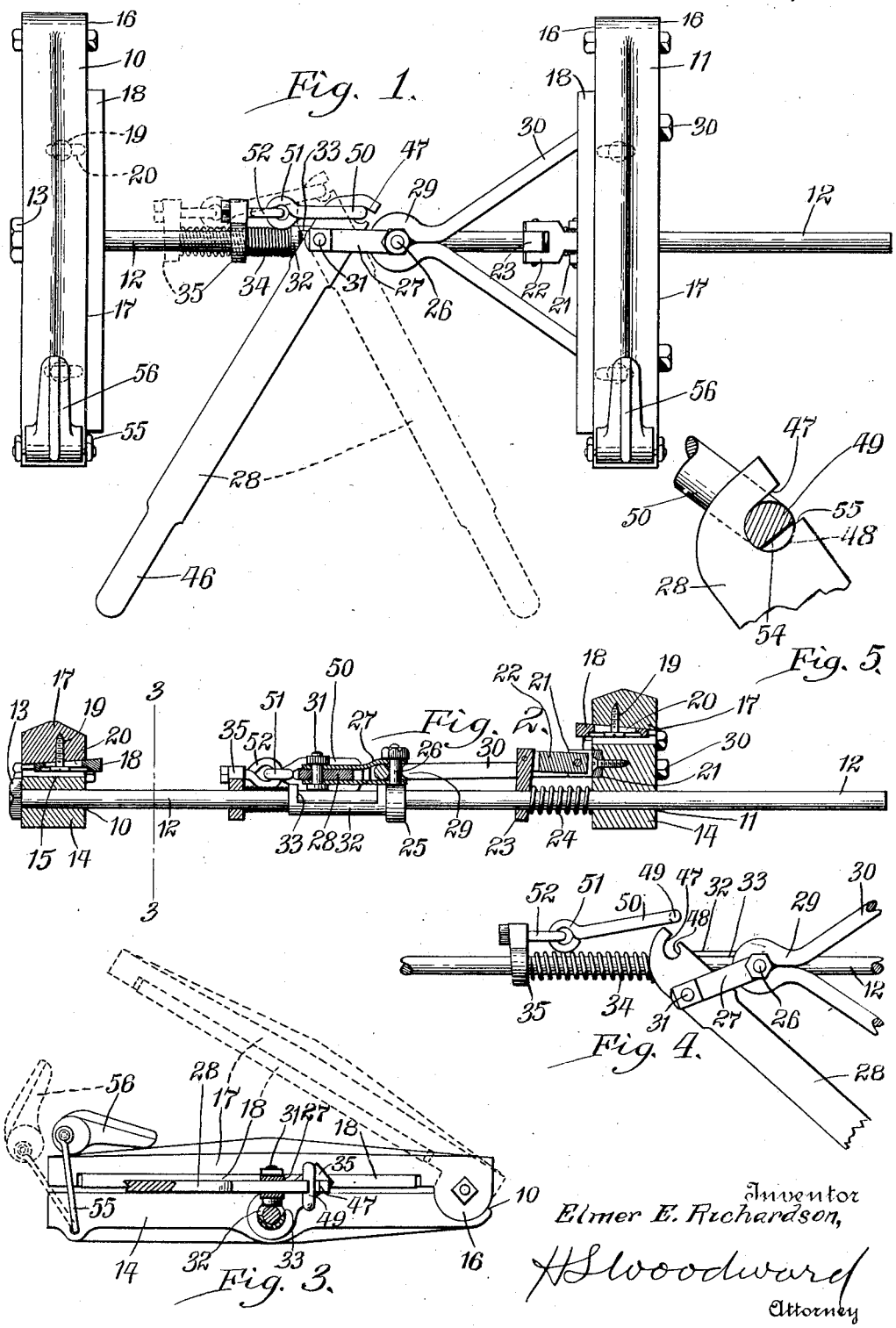

UNITED STATES PATENT OFFICE.

ELMER E. RICHARDSON, OF EATON, INDIANA, ASSIGNOR OF ONE-HALF TO GEORGE J. MILLER, OF EATON, INDIANA.

BELT-TIGHTENER.

1,338,096.   Specification of Letters Patent.   Patented Apr. 27, 1920.

Application filed November 5, 1917. Serial No. 200,338.

*To all whom it may concern:*

Be it known that I, ELMER E. RICHARDSON, a citizen of the United States, residing at Eaton, in the county of Delaware and State of Indiana, have invented certain new and useful Improvements in Belt-Tighteners, of which the following is a specification.

This invention relates to belt stretchers of that type in which two gripping devices are drawn toward each other by means of a lever and intermittent grip devices operative upon a rod connected to one gripping device and having slidable relation to the other, one or more of the intermittent gripping devices being connected to the last mentioned clamp. It is an important aim of the invention to effect improvements in the form of connections between the lever operating means and the grip devices, in the manner of mounting the belt clamp slidably upon the rod, whereby a single rod may be employed instead of a plurality as has been found necessary in prior devices of this character, and to simplify the form of the grip devices and the relation of the parts whereby manufacture will be simplified and the device adapted to operate at a maximum efficiency. It is also a purpose to so construct the device that the operating means by which the belt is stretched will interfere to a minimum degree with the lacing of a belt while held in the stretcher. A further aim is to improve the clamp devices in such a manner that liability of slipping of the belt therein will be minimized and also the hold of the clamping devices made uniform throughout the width of the belt, in case there should be any variation in thickness of the material of the belt.

Additional objects, advantages and features of invention will appear from the construction, arrangement and combination of parts hereinafter particularly described and shown in the drawings, wherein:

Figure 1 is a top plan view of the stretcher constructed in accordance with my invention, Fig. 2 is a longitudinal sectional view thereof, Fig. 3 is a cross section thereof, on the line 3—3 of Fig. 2, Fig. 4 is a detail of the lever and connected intermittent device, Fig. 5 is a detail of the connection between the lever and the grip link.

There is illustrated a stretcher comprising two clamps 10 and 11 respectively, one of which has a rod support 12 engaged therein with a head 13 disposed at the outer side of the clamp, while the other clamp 11 is slidable upon the intermediate portion of the rod.

Each clamp comprises a base portion 14, centrally apertured to receive the rod 12, the upper face 15 of each base piece being substantially flat. At one end the base piece is provided with male knuckles engaged between the female knuckles 16 of an upper or clamping section 17, having transversely slidable upon its inner face a wedge plate 18, extending throughout the major part of its length, being transversely tapered toward the outer edge, the inner face of the section 17 being inclined away from the rod toward the inner side of the clamp in each instance. The wedge plates are held to the clamp members by means of screws 19 having heads suitably countersunk in the broadened parts of slots 20 through which the screws are engaged. The plates 18 are preferably slightly roughened on their outer faces where they will be opposed to the faces 15 of the bases 14, and if desired the wedge plates may be slightly rounded at their edges.

Pivoted between ears 21 at the inner side of the sliding clamp there is a link 22, bifurcated at its outer end and having pivotally connected between the furcations the stem of a grip dog 23, having an enlargement at the opposite end from the link in which there is formed a cylindrical opening loosely receiving the rod 12. Between the base 14 and dog 23 there is confined a helical spring 24 by which the dog is normally held at the outer limit of its movement away from the base 14. The edges of the opening through the dog are angular, so that movement of the clamp in the direction of the spring is prevented by the binding of the dogs upon the rod in the manner familiar in such gripping devices, while opposite movement of the clamp will be quite free, owing to the tendency of the dog to move into position with the opening therethrough concentric with the rod 12 whenever sufficient friction is encountered to compress the spring 24. Outward movement of the clamp, however, may be readily accomplished by placing the fingers of one hand against the outer side of the clamp, and pressing upon the end of the dog immediately adjacent the rod 12 with the thumb and compressing the spring.

Slidable upon the rod 12 between the stationary clamp and the sliding clamp, there is a collar 25 having a stud 26 thereon, upon which are pivoted fulcrum links 27, between the outer ends of which a lever 28 of the first class is pivoted. To the stud 26, also, a yoke 29 is connected, having branched arms 30 secured in the base 14 of the sliding clamp at equal distances on each side of the rod 12. The lever 28 is pivoted in a plane as closely adjacent the rod 12 as possible, and the bolt 31 by which the links 27 are connected to the lever is formed with a flat head passing in immediate contact with the rod 12 at times. A sleeve 32 is extended outwardly from the collar 25 and toward the stationary clamp, cut away at the side next to the lever 28, so as to permit free movement of the head of the bolt 31 thereby, as shown at 33, and seated against the outer end of the sleeve there is a spring 34 coöperative with a grip dog 35, similar to the dog 23 before described, this dog extending diagonally with respect to the mean plane in which the clamps are located, and in the direction of the lever 28. The latter is provided with a handle 46 at one end, and at the other a short distance from its connection with the links 27 a slot 47 is formed opening upon the edge of the lever adjacent the sliding clamp, the slot terminating in a circular bearing 48, at its inner part of which the outer side of the slot forms a tangent, the slot being less in width than the diameter of the bearing. Removably engaged in the slot there is a journal portion 49, of a link 50 pivoted upon the outer end of the dog 35 in a suitable manner. In the present instance the link 50 in its main portion is in the form of an elongated eye having the journaled portion 49, of a link 50 pivoted upon the outer end of the dog 35 in a suitable manner. In the present instance the link 50 in its main portion is in the form of an elongated eye having the journaled portion 49 at its outer part, a shank piece 51 being formed at the opposite end of the link which is curved to form an eye engaged in an eye bolt 52 fixed upon the outer end of the dog 35. The shank 51 is bent in a plane at right angles to the plane of the link 50 so as to permit proper movement thereof upon the eye bolt 52, the latter being disposed in a plane at right angles to the mean plane of the two clamps. The spring 34 is of such a length that it will be released from compression between the dog 35 and the sleeve 32 when the handle 46 of the lever is closely adjacent the limit of its movement toward the sliding clamp, and when the spring has forced the dog 45 to the limit of its movement permitted by the link 50 with the lever in the position described, and indicated in dotted lines in Figs. 1 and 4. The journal portion 49 is provided with a flattened side 54, which will be alined with the inner side 55 of the slot 47 when the lever is in the last mentioned position, so that by pressing outwardly the link 50, toward the outer end of the slot 47 it may be moved out of engagement with the lever 28, leaving the sliding clamp supported by the dog 23, and permitting free movement of the remaining dog and spring upon the rod 12, and also permitting various adjustments of the lever 28 and the lever 27 to remove them from positions where they might impede operations involved in the lacing of a belt held in the stretcher. This latter arrangement will permit the tight lacing of a belt while stretched, with the end portions in a common plane closely adjacent the rod 12, so that no slack in the ends of the belt will be required while being laced, as will be readily understood. Upon the end of each base member 14 opposite the pivot, a bail link 55 is pivoted, carrying at its outer part a cam lever 56, swinging in such an arc that it may pass over the swinging end of the respective member 17 when brought into close relation to the base 14, and used to compress the member 17 upon a belt laid over the base 14. By means of the plate 18 the device may be adjusted to belts of various thicknesses and a maximum clamping efficiency of the cam lever 56 obtained with the various thicknesses of belts. The plate 18 may tend to wedge in the space between the clamp element when a belt is engaged therebetween, but it is not depended upon for automatic clamping action, as in such devices this is not found satisfactory, and the purpose of this device is to adjust the space between the clamping element so that the cam device 56 may exert the maximum pressure upon the engaged belt ends when operated, and also so that it may be operated to its full limit and the end of the cam lever disposed closely against the swinging clamp member.

What is claimed:

In a device of the character described a support, a stationary clamp thereon, a sliding clamp thereon, spring actuated grip dogs operative upon the support against movement outwardly from said stationary clamp, one of said grip dogs being connected to the sliding clamp, a hand lever of the first order, a fulcrum link therefor connected to said sliding clamp, a slot in the lever outwardly of its fulcrum opening through one edge and having a circular enlargement at its inner end, a link having a bearing portion constructed for snug revoluble engagement in said enlargement and flattened for passage through the slot when the lever and link are in a predetermined relation, said link being connected to the other of said grip devices, the springs of the last named dog being adapted to move the dog a distance such as to leave the parts freely movable for disengagement of the links from the slot of the lever as described.

In testimony whereof I have affixed my signature in presence of two witnesses.

ELMER E. RICHARDSON.

Witnesses:
 CARLETON VANBINKIN,
 WILL BRANDT.